(12) United States Patent
Cai et al.

(10) Patent No.: US 12,435,101 B2
(45) Date of Patent: Oct. 7, 2025

(54) ISOCHROMAN COMPOUND

(71) Applicant: Zhejiang Yangli Pharmaceutical Technology Co., Ltd., Zhejiang (CN)

(72) Inventors: Zhe Cai, Shanghai (CN); Fei Sun, Shanghai (CN); Charles Z. Ding, Shanghai (CN); Shuhui Chen, Shanghai (CN)

(73) Assignee: Zhejiang Yangli Pharmaceutical Technology Co., Ltd., Zhejiang (CN)

( * ) Notice: Subject to any disclaimer, the term of this patent is extended or adjusted under 35 U.S.C. 154(b) by 438 days.

(21) Appl. No.: 18/044,791

(22) PCT Filed: Sep. 15, 2021

(86) PCT No.: PCT/CN2021/118597
§ 371 (c)(1),
(2) Date: Mar. 10, 2023

(87) PCT Pub. No.: WO2022/057838
PCT Pub. Date: Mar. 24, 2022

(65) Prior Publication Data
US 2023/0348503 A1    Nov. 2, 2023

(30) Foreign Application Priority Data
Sep. 18, 2020   (CN) .................. 202010991814.1

(51) Int. Cl.
C07F 9/6558   (2006.01)
A61P 35/00   (2006.01)

(52) U.S. Cl.
CPC .......... *C07F 9/65586* (2013.01); *A61P 35/00* (2018.01)

(58) Field of Classification Search
CPC .... C07F 9/65586; A61P 35/00; C07D 311/76; C07D 405/15
See application file for complete search history.

(56) References Cited

U.S. PATENT DOCUMENTS 10,766,914 B2 *   9/2020   Duan ............... G01N 33/57484

FOREIGN PATENT DOCUMENTS

| CN | 107530556 A | 1/2018 |
|---|---|---|
| CN | 108136214 A | 6/2018 |
| CN | 108290911 A | 7/2018 |
| WO | 2021068952 A1 | 4/2022 |

OTHER PUBLICATIONS

Dec. 16, 2021 International Search Report issued in International Patent Application No. PCT/CN2021/118597.
Dec. 16, 2021 Written Opinion of the International Searching Authority issued in International Patent Application No. PCT/CN2021/118597.
Mar. 21, 2023 International Preliminary Report on Patentability Chapter I issued in International Patent Application No. PCT/CN2021/118597.
EESR of Corresponding EP21868660.8 issued on Feb. 6, 2024.
First Office Action of Corresponding EP21868660.8 issued on Feb. 20, 2024.
First Office Action and search report of Corresponding CN2021800640487 issued on May 27, 2024.

* cited by examiner

*Primary Examiner* — Joseph K Mckane
*Assistant Examiner* — Anna Grace Kuckla
(74) *Attorney, Agent, or Firm* — Houston Beshining Law Office PLLC; Liangang Ye

(57) ABSTRACT

Provided is an isochroman compound represented by formula (I), or a pharmaceutically acceptable salt thereof, which is used as an aldo-keto reductase (AKR1C3) inhibitor for the treatment of liver cancer.

14 Claims, 3 Drawing Sheets

ISOCHROMAN COMPOUND

The present application is a National Stage of International Application No. PCT/CN2021/118597, filed on Sep. 15, 2021, which claims the priority of the Chinese Patent Application NO. CN202010991814.1 filed on Sep. 18, 2020.

TECHNICAL FIELD

The present disclosure relates to isochroman compounds with novel structures, in particular to a compound represented by formula (I) or a pharmaceutically acceptable salt thereof, and a use of the compound represented by formula (I) or the pharmaceutically acceptable salt thereof in the treatment-related field.

BACKGROUND

Malignant tumor is a major disease that seriously threatens human life and health. Current treatment methods mainly include surgical therapy, chemotherapy and targeted therapy. Chemotherapy is a treatment method that uses chemical drugs to kill tumor cells and inhibit the growth of tumor cells, which is a systemic treatment method. Due to the heterogeneity of malignancies, chemotherapy remains an important method for the treatment of tumors. However, it is this systemic treatment that causes chemotherapy to have significant side effects. There is a huge unmet clinical need for developing targeted chemotherapeutics.

Aldo-keto reductase (AKR1C3) is a member of the aldo-keto reductase family, which is mainly involved in hormone synthesis and toxin removal. Overexpression of AKR1C3 can be induced by factors such as smoking, alcohol, hepatitis B or hepatitis C infection. AKR1C3 is overexpressed in a variety of refractory cancers, such as liver cancer, lung cancer, gastric cancer, esophageal cancer, colorectal cancer, prostate cancer and acute lymphoblastic leukemia, especially liver cancer, with a high expression rate of more than 60%.

Currently, AKR1C3 inhibitor drugs are being developed clinically, but no good progress has been made. Taiwan OBI Pharma, Inc. reported a compound OBI-3424 targeting the AKR1C3 enzyme. OBI-3424 is a selective prodrug that releases a potent DNA alkylating agent in tumor cells with high expression of AKR1C3 enzyme, selectively kills tumor cells with high expression of AKR1C3, and enables the chemical drug to have obvious targeting effects.

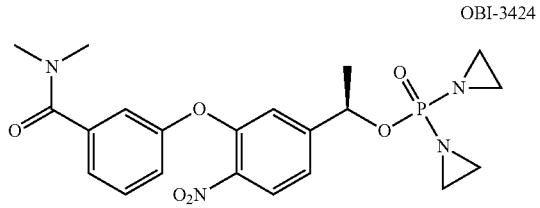 [SMILES: C[C@@H](OP(=O)(N1CC1)N1CC1)c1ccc([N+](=O)[O-])c(Oc2cccc(C(=O)N(C)C)c2)c1]
OBI-3424

At present, the research on this target is still in the early stage. Only OBI-3424 has entered the clinical phase I, the indications are mainly hepatocellular carcinoma (HCC) and castration resistant prostate cancer (CRPC), and the effectiveness and safety of OBI-3424 are still being verified. Therefore, more exploration and research are needed in this field.

CONTENT OF THE PRESENT DISCLOSURE

The present disclosure a compound represented by formula (I) or a pharmaceutically acceptable salt thereof,

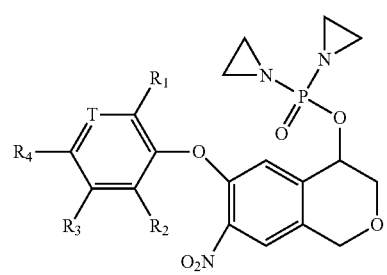
(I)

wherein T is N or CH;

$R_1$ and $R_2$ are each independently H, F, Cl, Br, I, or $C_{1-3}$ alkyl, wherein the $C_{1-3}$ alkyl is optionally substituted by 1, 2, or 3 $R_a$;

each $R_a$ is independently F, Cl, Br, I, —CN, —OH or —NH$_2$.

$R_3$ and $R_4$ are each independently H, F, Cl, Br, I, CN, $C_{1-3}$ alkyl, $C_{1-3}$ alkoxy,

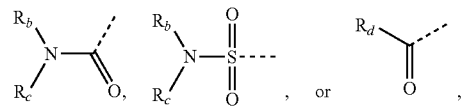

wherein the $C_{1-3}$ alkyl is optionally substituted by 1, 2 or 3 $R_e$;

$R_b$ and $R_c$ are each independently H, —CH$_3$, —CH$_2$CH$_3$, —(CH$_2$)$_2$CH$_3$ or —CH(CH$_3$)$_2$;

$R_d$ is —CH$_3$, —CH$_2$CH$_3$, —(CH$_2$)$_2$CH$_3$ or —CH(CH$_3$)$_2$;

each $R_e$ is independently F, Cl, Br, I, —CN, —OH or —NH$_2$.

In some embodiments of the present disclosure, the compound has a structure represented by formula (I-1) or formula (I-2):

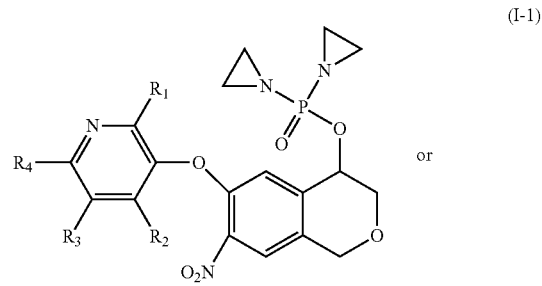
(I-1)

or

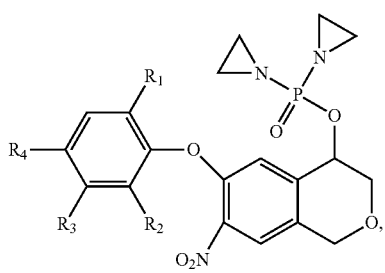
(I-2)

wherein $R_1$, $R_2$, $R_3$ and $R_4$ are as defined in the present disclosure.

In some embodiments of the present disclosure, the compound has the structure represented by formula (I-3) or formula (1-4):

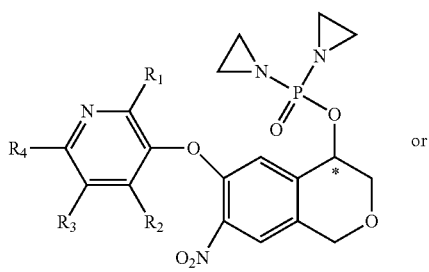
(I-3)

or

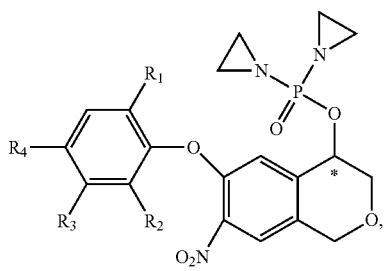
(I-4)

wherein the carbon atoms with "*" are chiral carbon atoms, which exist in the form of (R) or (S) single enantiomer or enriched in one enantiomer; $R_1$, $R_2$, $R_3$ and $R_4$ are as defined in the present disclosure.

In some embodiments of the present disclosure, the $R_1$ and $R_2$ are each independently H, F, Cl, Br, I, or —CH$_3$, wherein the —CH$_3$ is optionally substituted by 1, 2, or 3 $R_a$, $R_a$ and other variables are as defined in the present disclosure.

In some embodiments of the present disclosure, the $R_1$ is H, F, Cl, Br, I or —CH$_3$, and other variables are as defined in the present disclosure.

In some embodiments of the present disclosure, the $R_2$ is H, and other variables are as defined in the present disclosure.

In some embodiments of the present disclosure, the $R_1$ is H, F, Cl, Br, I or —CH$_3$; $R_2$ is H, and other variables are as defined in the present disclosure.

In some embodiments of the present disclosure, the $R_3$ and $R_4$ are each independently H, F, Cl, Br, I, CN, —CH$_3$, —OCH$_3$,

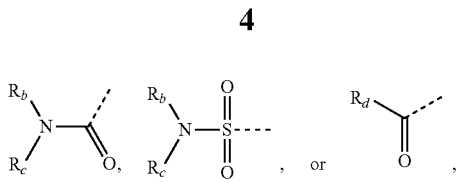

wherein the —CH$_3$ is optionally substituted by 1, 2 or 3 $R_e$, and $R_e$ and other variables are as defined in the present disclosure.

In some embodiments of the present disclosure, the $R_3$ and $R_4$ are each independently H, F, —CH$_3$, —CHF$_2$, —OCH$_3$,

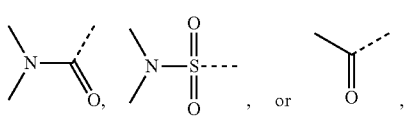

and other variables are as defined in the present disclosure.

In some embodiments of the present disclosure, the $R_3$ and $R_4$ are each independently H, F, —CH$_3$, —CHF$_2$, —OCH$_3$, and other variables are as defined in the present disclosure.

In some embodiments of the present disclosure, the $R_3$ and $R_4$ are each independently H.

There are still some embodiments of the present disclosure which are obtained by any combination of the above variables.

The present disclosure also provides a compound represented by the following formula or a pharmaceutically acceptable salt thereof,

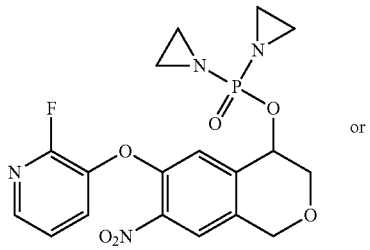

or

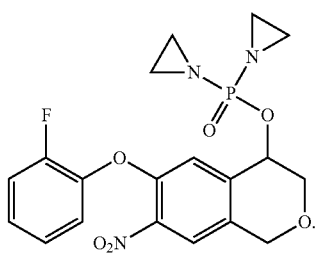

The present disclosure also provides a compound represented by the following formula or a pharmaceutically acceptable salt thereof,

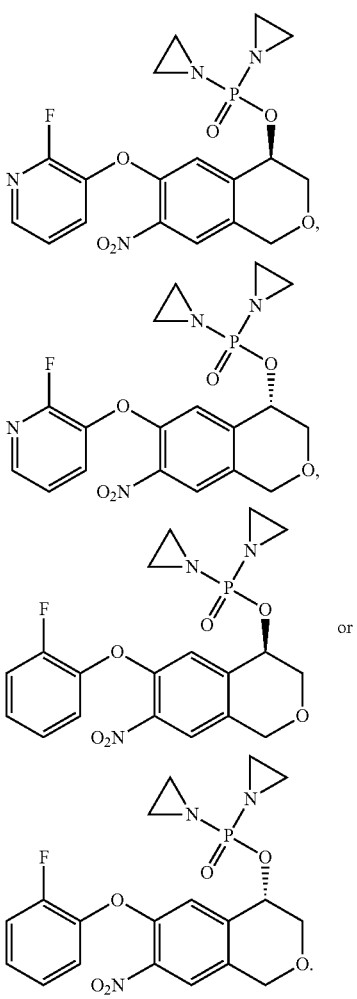

The present disclosure also provides a use of the compound or the pharmaceutically acceptable salt thereof in the manufacture of a medicament for targeting AKR1C3 enzyme.

The present disclosure also provides a use of the compound or a pharmaceutically acceptable salt thereof in the manufacture of a medicament for treating liver cancer.

TECHNICAL EFFECT

The present disclosure provides a compound targeting AKR1C3 with novel structure. The compound of the present disclosure has excellent anti-proliferative activity on tumor cells with high expression of AKR1C3, and weak activity on tumor cells with low expression of AKR1C3, exhibiting excellent selectivity. In both the subcutaneous model and the orthotopic model of liver cancer, the compound of the present disclosure exhibits significant antitumor efficacy.

Definition

Unless otherwise specified, the following terms and phrases used herein are intended to have the following meanings. A specific term or phrase should not be considered indefinite or unclear in the absence of a particular definition, but should be understood in the ordinary sense. When a trade name appears herein, it is intended to refer to its corresponding commodity or active ingredient thereof. The term "pharmaceutically acceptable" is used herein in terms of those compounds, materials, compositions, and/or dosage forms, which are suitable for use in contact with human and animal tissues within the scope of reliable medical judgment, without excessive toxicity, irritation, anaphylactic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by contacting the neutral form of the compound with a sufficient amount of a base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by contacting the neutral form of compound with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to any base or acid addition salt.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof.

In addition to salt forms, the compounds provided in the present disclosure also exist in prodrug forms. Prodrugs of the compounds described herein readily undergo chemical changes under physiological conditions to convert themselves to the compounds of the present disclosure. In addition, the prodrugs can be converted to the compounds of the present disclosure by chemical or biochemical methods in an in vivo environment.

Certain compounds of the present disclosure can exist in an unsolvated or solvated form, including a hydrated form. In general, the solvated form are equivalent to the unsolvated form and are within the scope of the present disclosure.

The compound of the present disclosure may exist in a specific geometric or stereoisomeric form. The present disclosure contemplates all such compounds, including cis and trans isomer, (−)- and (+)-enantiomer, (R)- and (S)-enantiomer, diastereoisomer, (D)-isomer, (L)-isomer, racemic mixture and other mixtures, such as an enantiomer or diastereoisomer enriched mixture, all of which are encompassed within the scope of the present disclosure. Additional asymmetric carbon atoms may be present in substituents such as alkyl. All these isomers, as well as mixtures thereof are encompassed within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(D)" or "(+)" refers to dextrorotation, "(L)" or "(−)" refers to levorotation, and "(DL)" or "(±)" refers to racemic.

Unless otherwise specified, the absolute configuration of a stereogenic center is represented by a wedged solid bond ( ➚ ) and a wedged dashed bond ( ⋯ ), and the relative configuration of a stereogenic center is represented by a straight solid bond ( ➚ ) and a straight dashed bond ( ⋯ ), a wave line ( ∿ ) is used to represent a wedged solid bond ( ➚ ) or a wedged dashed bond ( ⋯ ), or the wave line ( ∿ ) is used to represent a straight solid bond ( ➚ ) and a straight dashed bond ( ⋯ ).

The compounds of the present disclosure may exist in particular. Unless otherwise specified, the term "tautomer" or "tautomeric form" refers to the isomers of different functional groups are in dynamic equilibrium and can be transformed into each other quickly at room temperature. If tautomers are possible (such as in solution), the chemical equilibrium of tautomers can be reached. For example, proton tautomers (also called prototropic tautomers) include interconversion through proton migration, such as keto-enol isomerization and imine-enamine isomerization. Valence tautomers include some interconversions by recombination of some bonding electrons. A specific example of keto-enol tautomerization is the interconversion between two tautomers of pentane-2,4-dione and 4-hydroxypent-3-en-2-one.

Unless otherwise specified, the terms "enriched in one isomer", "enriched in isomers", "enriched in one enantiomer" or "enriched in enantiomers" refer to the content of one of the isomers or enantiomers is less than 100%, and the content of such isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomeric excess" or "enantiomeric excess" refers to the difference between the relative percentages of two isomers or two enantiomers. For example, if the content of one isomer or enantiomer is 90%, and the content of the other isomer or enantiomer is 10%, and the isomer or enantiomeric excess (ee value) is 80%.

Optically active (R)- and (S)-isomers, as well as D and L isomers, can be prepared by chiral synthesis or chiral reagents or other conventional techniques. If one enantiomer of a compound of the present disclosure is desired, the pure desired enantiomer can be prepared by asymmetric synthesis or derivatization of chiral auxiliary followed by separating the resulting diastereomeric mixture and cleaving the auxiliary group. Alternatively, when the molecule contains a basic functional group (such as an amino) or an acidic functional group (such as a carboxyl), the compound reacts with an appropriate optically active acid or base to form a salt of the diastereomeric isomer which is then subjected to diastereomeric resolution through the conventional method in the art to give the pure enantiomer. In addition, the enantiomer and the diastereoisomer are generally isolated through chromatography which uses a chiral stationary phase and optionally combines with a chemical derivative method (such as carbamate generated from amine). The compound of the present disclosure may contain an unnatural proportion of atomic isotope at one or more atom(s) that constitute the compound.

For example, the compound can be labeled with a radioactive isotope, such as tritium ($^3H$), iodine-125 ($^{125}I$) or C-14 ($^{14}C$). For another example, deuterated drugs can be formed by replacing hydrogen with heavy hydrogen, the bond formed by deuterium and carbon is stronger than that by ordinary hydrogen and carbon, compared with non-deuterated drugs, deuterated drugs have the advantages of reduced toxic and side effects, increased drug stability, enhanced efficacy, extended biological half-life of drugs, etc. All isotopic variations of the compound of the present disclosure, whether radioactive or not, are encompassed within the scope of the present disclosure.

The term "optional" or "optionally" means that the subsequently described event or circumstance may, but does not necessarily, occur, and the description includes instances where the event or circumstance occurs and instances where it does not.

The term "substituted" means one or more hydrogen atom(s) on a specific atom are substituted by the substituent, including deuterium and hydrogen variables, as long as the valence of the specific atom is normal and the substituted compound is stable. When the substituent is an oxygen (i.e., =O), it means two hydrogen atoms are substituted. Positions on an aromatic ring cannot be substituted with an oxygen. The term "optionally substituted" means an atom can be substituted by a substituent or not, unless otherwise specified, the type and number of the substituent may be arbitrary as long as being chemically achievable.

When any variable (such as R) occurs in the constitution or structure of the compound more than once, the definition of the variable at each occurrence is independent. Thus, for example, if a group is substituted by 0-2 R(s), the group can be optionally substituted by up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When one of the variables is selected from a single bond, it means that the two groups linked by the single bond are connected directly. For example, when L in A-L-Z represents a single bond, the structure of A-L-Z is actually A-Z.

When a substituent is vacant, it means that the substituent does not exist, for example, when X is vacant in A-X, the structure of A-X is actually A. When the enumerative substituent does not indicate by which atom it is linked to the group to be substituted, such substituent can be bonded by any atom thereof. For example, when pyridyl acts as a substituent, it can be linked to the group to be substituted through any carbon atom on the pyridine ring.

When the enumerative linking group does not indicate the direction for linking, the direction for linking is arbitrary, for example, the linking group L contained in

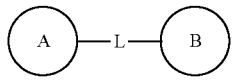

is -M-W—, then -M-W— can link ring A and ring B to form

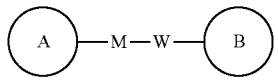

in the direction same as left-to-right reading order, and form

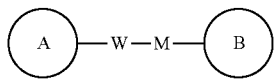

in the direction contrary to left-to-right reading order. A combination of the linking groups, substituents and/or variables thereof is allowed only when such combination can result in a stable compound.

Unless otherwise specified, when a group has one or more linkable sites, any one or more sites of the group can be linked to other groups through chemical bonds. The chemical bond between the site and other groups can be represented by a straight solid bond ( / ), a straight dashed bond ( ⁄ ) or a wave line (

). For example, the straight solid bond in —OCH₃ represents the connection from the oxygen atom in the group to other groups; the straight dashed bond in

H represents the connection from the two ends of the nitrogen atom in the group to other groups; the wave line

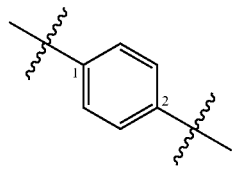 [SMILES: *c1ccc(*)cc1]

represents the connection from the carbon atoms of position 1 and 2 in the phenyl group to other groups.

Unless otherwise specified, the number of atoms in a ring is generally defined as the number of ring members, e.g., "5- to 7-membered ring" means a "ring" with 5-7 atoms arranged around it.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl, etc.; it can be monovalent (such as methyl), divalent (such as methylene) or multivalent (such as methine). Examples of $C_{1-3}$ alkyl include but are not limited to methyl (Me), ethyl (Et), propyl (including n-propyl and isopropyl), etc.

Unless otherwise specified, the term "$C_{1-3}$ alkoxy" refers to an alkyl group containing 1 to 3 carbon atoms that are connected to the rest of the molecule through an oxygen atom. The $C_{1-3}$ alkoxy includes $C_{1-2}$, $C_{2-3}$, $C_3$ and $C_2$ alkoxy, etc. Examples of $C_{1-3}$ alkoxy include, but are not limited to, methoxy, ethoxy, propoxy (including n-propoxy and iso-propoxy), etc.

Unless otherwise specified, $C_{n-n+m}$ or $C_n$—$C_{n+m}$ includes any specific case of n to n+m carbons, for example, $C_{1-12}$ includes $C_1$, $C_2$, $C_3$, $C_4$, $C_5$, $C_6$, $C_7$, $C_8$, $C_9$, $C_{10}$, $C_{11}$, and $C_{12}$, and any range from n to n+m is also included, for example $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$, and $C_{9-12}$, etc.; similarly, n-membered to n+m-membered means that the number of atoms on the ring is from n to n+m, for example, 3- to 12-membered ring includes 3-membered ring, 4-membered ring, 5-membered ring, 6-membered ring, 7-membered ring, 8-membered ring, 9-membered ring, 10-membered ring, 11-membered ring, and 12-membered ring, and any range from n to n+m is also included, for example, 3- to 12-membered ring includes 3- to 6-membered ring, 3- to 9-membered ring, 5- to 6-membered ring, 5- to 7-membered ring, 6- to 7-membered ring, 6- to 8-membered ring, and 6- to 10-membered ring, etc.

The term "leaving group" refers to a functional group or atom which can be replaced by another functional group or atom through a substitution reaction (such as nucleophilic substitution reaction). For example, representative leaving groups include triflate; chlorine, bromine, and iodine; sulfonate group, such as mesylate, tosylate, p-bromobenzenesulfonate, p-toluenesulfonates and the like; acyloxy, such as acetoxy, trifluoroacetoxy, etc.

The term "protecting group" includes, but is not limited to "amino protecting group", "hydroxyl protecting group" or "mercapto protecting group". The term "amino protecting group" refers to a protecting group suitable for preventing the side reactions occurring at the nitrogen of an amino. Representative amino protecting groups include, but are not limited to: formyl; acyl, such as alkanoyl (e.g., acetyl, trichloroacetyl or trifluoroacetyl); alkoxycarbonyl, such as tert-butoxycarbonyl (Boc); arylmethoxycarbonyl, such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl)methyl; silyl, such as trimethylsilyl (TMS) and tert-butyldimethylsilyl (TBS), etc. The term "hydroxyl protecting group" refers to a protecting group suitable for preventing the side reactions of hydroxyl. Representative hydroxyl protecting groups include, but are not limited to: alkyl, such as methyl, ethyl, and tert-butyl; acyl, such as alkanoyl (e.g., acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tert-butyl dimethyl silyl (TBS), etc.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The following abbreviations are used in the present disclosure:

| | |
|---|---|
| Pd/C | Pd/C catalyst, palladium content 10 w % |
| DCM | Dichloromethane |
| THF | Tetrahydrofuran |
| EtOAc | Ethyl acetate |
| TBME | Tert-butyl methyl ether |
| Boc | Tert-butoxycarbonyl, an amine protecting group |
| Cbz | Benzyloxycarbonyl, an amine protecting group |
| DMF | N,N-Dimethylformamide |
| TFA | Trifluoroacetate |
| PE | Petroleum ether |
| DMSO | Dimethyl sulfoxide |
| EtOH | Ethanol |
| MeOH | Methanol |
| AcOH | Acetic acid |
| DIPEA | Diisopropylethylamine |
| $SiO_2$ | 100-200 mesh silica gel powder for column chromatography |
| psi | Pounds per square inch, unit of pressure |
| p-HPLC | Preparative high performance liquid chromatography for purification of compounds |

The compounds of the present disclosure are named according to the conventional naming principles in the art or by ChemDraw® software, and the commercially available compounds use the supplier catalog names.

The solvents used in the present disclosure are commercially available and do not require further purification. The reaction is generally carried out in an anhydrous solvent under an inert nitrogen atmosphere. Proton nuclear magnetic resonance data are recorded on a Bruker Avance III 400 (400 MHz) spectrometer, and chemical shifts are illustrated in (ppm) at high field of tetramethylsilane. LC/MS or Shimadzu MS comprises a DAD: SPD-M20A (LC) and Shimadzu Micromass 2020 detector. The mass spectrometer is equipped with an Electron Spray Ionization (ESI) operating in positive or negative mode.

The structure of the compound of the present disclosure can be confirmed by conventional methods well known to those skilled in the art, and if the disclosure relates to the absolute configuration of a compound, then the absolute configuration can be confirmed by conventional technical means in the art. For example, in the case of single crystal X-ray diffraction (SXRD), diffraction intensity data of the cultured single crystal was collected by a Bruker D8 venture diffractometer, the light source was CuKα radiation, and the scanning mode: (p/scan. After collecting the relevant data, the crystal structure can be further analyzed by direct method (Shelxs97), and then the absolute configuration can be confirmed.

HPLC analysis was performed on Shimadzu LC20AB system equipped with Shimadzu SIL-20A autosampler and Japan Shimadzu DAD: SPD-M20A detector, Xtimate C18 (3 m filler, Spec 2.1×300 mm) chromatography column was used. 0-60AB_6 minutes method: a linear gradient was applied, starting the elution with 100% A (A is 0.0675% TFA in water), and ending it with 60% B (B is 0.0625% TFA in MeCN). The whole process is 4.2 minutes, followed by elution with 60% B for 1 minute. The column was re-equilibrated for 0.8 minutes to 100:0, and the total run time is 6 minutes. 10-80AB_6 minutes method: a linear gradient was applied, starting the elution with 90% A (A is 0.0675% TFA in water) and ending it with 80% B (B is 0.0625% TFA in acetonitrile). The whole process is 4.2 minutes, followed by elution with 80% B for 1 minute. The column was re-equilibrated for 0.8 minutes to 90:10, and the total run time was 6 minutes. The column temperature was 50° C., and the flow rate was 0.8 mL/min. Scanning wavelength of diode array detector was 200-400 nm.

Thin-layer chromatography (TLC) was performed on silica gel GF254 from Sanpont-group. Spots were often detected by irradiation with a UV lamp, other methods were also used to detect spots in some cases wherein the TLC plate was developed by iodine (made by adding about 1 g iodine to 10 g silica gel and mixing thoroughly), vanillin (made by dissolving about 1 g vanillin in 100 mL of 10% $H_2SO_4$), ninhydrin (commercially available from Aldrich) or special developer (made by mixing thoroughly 25 g $(NH_4)6Mo_7O_{24} \cdot 4H_2O$, 5 g $(NH_4)2Ce(IV)(NO_3)_6$, 450 mL $H_2O$ and 50 mL concentrated $H_2SO_4$) to inspect the compound. Fash column chromatography was performed on the 40-63 m (230-400 mesh) silica gel from Silicycle using the similar method of disclosed technology in Still, W. C.; Kahn, M.; and Mitra, M. Journal of Organic Chemistry, 1978, 43, 2923-2925. Common solvents for flash column chromatography or thin-layer chromatography are mixtures of dichloromethane/methanol, EtOAc/methanol and petroleum ether/EtOAc.

Preparative chromatographic analysis was performed on Gilson-281 Prep LC 322 system of Gilson UV/VIS-156 detector. The columns used were Agella Venusil ASB Prep C18 (5 m filler, Spec 150×21.2 mm), Phenomenex Gemini C18 (5 m filler, Spec 150×30 mm), Boston Symmetrix C18 (5 m filler, Spec 150×30 mm), or Phenomenex Synergi C18 (4 m filler, Spec 150×30 mm). Compounds were eluted with a low gradient of acetonitrile/water (10 mM ammonium bicarbonate in water) at a flow rate of approximately 25 mL/min, and the total run time was 8-15 minutes.

DETAILED DESCRIPTION OF THE PREFERRED EMBODIMENT

Figure 1:
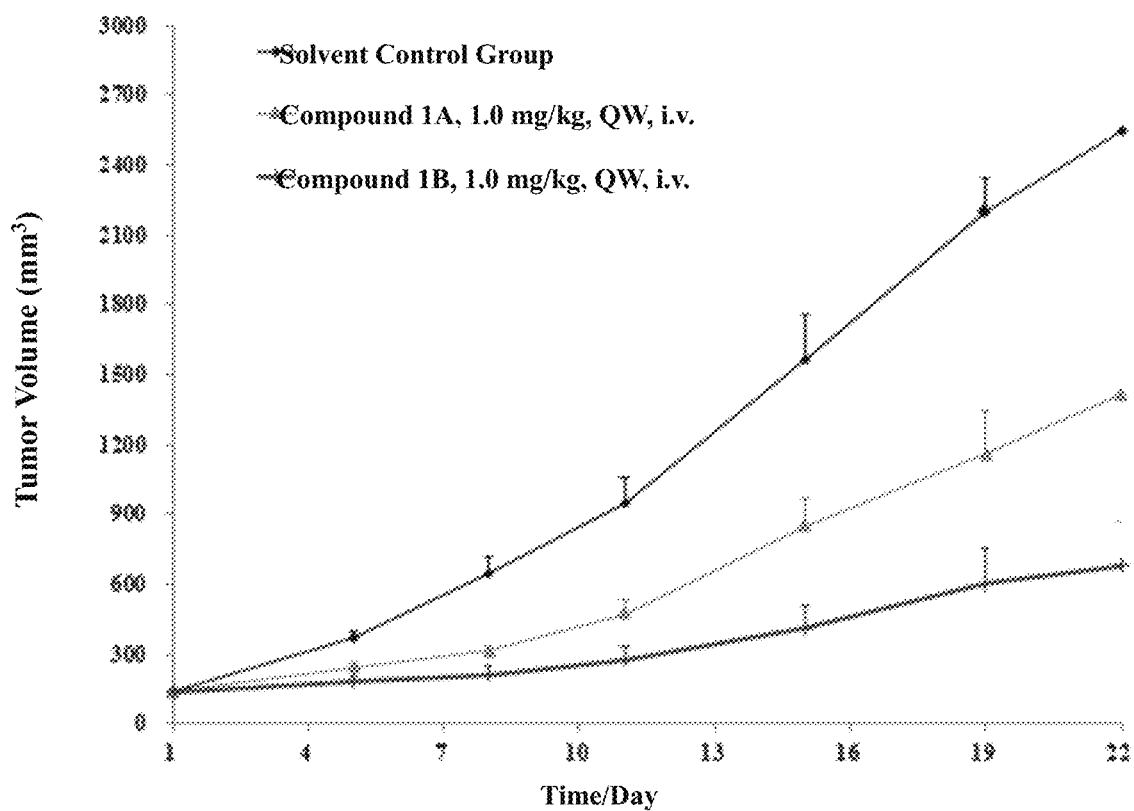
FIG. 1 is the tumor volume growth curve of each group during the administration period.

The following embodiments further illustrate the present disclosure in detail, but it does not mean that there are any adverse restrictions on the present disclosure. The present disclosure has been described in detail herein, and specific embodiments thereof have also been disclosed. For one Embodiment 1

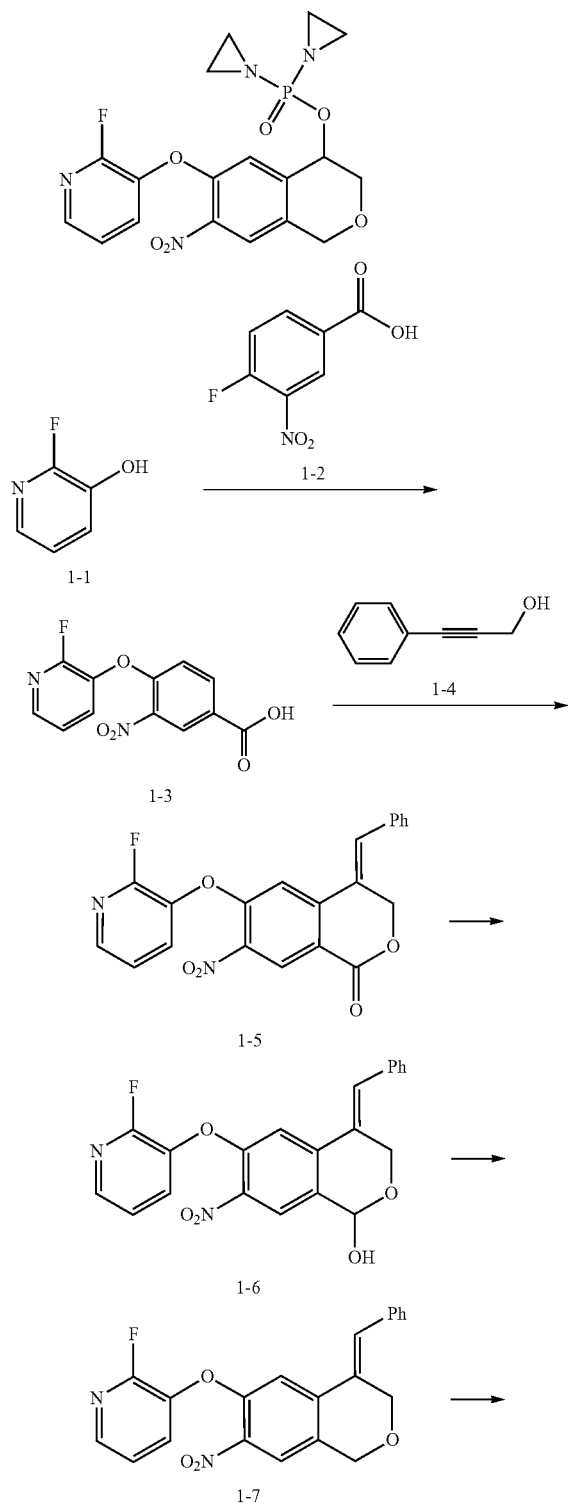

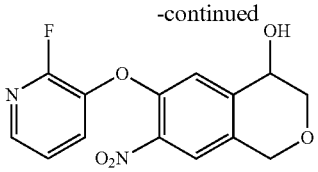

1-8

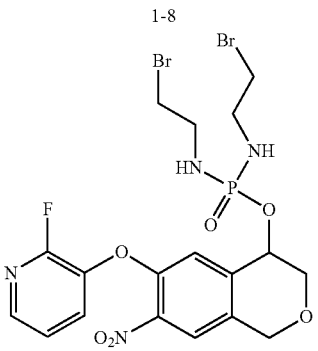

1-9

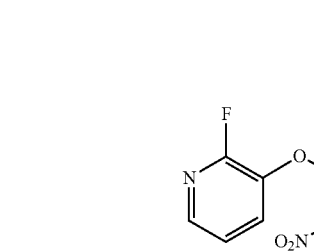

1

Step A: Compound 1-1 (5 g, 44.21 mmol) was dissolved in DMF (50 mL), and potassium carbonate (18.33 g, 132.64 mmol) and Compound 1-2 (9 g, 48.63 mmol) were added. The reaction solution was stirred at 50° C. for 12 hours. The reaction solution was concentrated under reduced pressure, water (50 mL) was added to the residue, and the pH was adjusted to 1 with dilute hydrochloric acid (1 mol/L). After filtration, the filter cake was vacuum dried to obtain Compound 1-3. $^1$H NMR (DMSO-$d_6$, 400 MHz) δ 13.88-13.37 (m, 1H), 8.55 (d, J=2.0 Hz, 1H), 8.21-8.16 (m, 2H), 7.97 (ddd, J=1.6, 8.1, 9.9 Hz, 1H), 7.50 (dd, J=5.0, 7.8 Hz, 1H), 7.29 (d, J=8.8 Hz, 1H).

Step B: Compound 1-3 (6 g, 21.57 mmol) were dissolved in dioxane (150 ml), and dichloro(p-cymene)ruthenium(II) dimer (1.32 g, 2.16 mmol), guanidine carbonate (1.94 g, 10.78 mmol), Compound 1-4 (3.91 g, 29.55 mmol) and AcOH (1.30 g, 21.57 mmol) were added. Under nitrogen protection, the reaction solution was stirred at 105° C. for 16 hours. The reaction solution was concentrated under reduced pressure. The crude product was purified by column chromatography (SiO$_2$, PE:EtOAc=1:0-5:1) to obtain Compound 1-5.

$^1$H NMR (DMSO-$d_6$, 400 MHz) δ 8.64 (s, 1H), 8.14 (td, J=1.5, 4.8 Hz, 1H), 7.92 (ddd, J=1.7, 8.1, 10.0 Hz, 1H), 7.80 (s, 1H), 7.60 (s, 1H), 7.52-7.42 (m, 4H), 7.39-7.32 (m, 2H), 5.42 (d, J=1.2 Hz, 2H).

Step C: Compound 1-5 (2.5 g, 6.37 mmol) was added to toluene (50 ml), and cooled to minus 60 degrees Celsius, then diisobutylaluminum hydride (1 mol/L, 12.11 ml) was added. The reaction solution was stirred at minus 60 degrees Celsius for 2 hours. The reaction solution was quenched by adding water (1 ml) at minus 60 degrees Celsius, and sodium tartrate aqueous solution (4.5 g dissolved in 100 ml) was added, and the mixture was stirred for 1.5 hours, then extracted with EtOAc (100 ml×2), then the organic phases were combined and washed with brine (50 mL×1), dried over anhydrous sodium sulfate and concentrated under reduced pressure. The crude Compound 1-6 was obtained.

Step D: Compound 1-6 (2.4 g, 1.06 mmol) and triethylsilyl hydride (2.12 g, 18.26 mmol) were added to DCM (50 mL), and TFA (2.08 g, 18.26 mmol) was added at 0 degrees Celsius. The mixture was slowly heated to 25° C. and stirred for 2 hours. DCM (100 mL) was added to the reaction solution, and the solution was washed with sodium bicarbonate (50 mL×1), then the combined organic phase was washed with brine (20 mL), dried over anhydrous sodium sulfate, filtered and concentrated under reduced pressure. The crude product was purified by column chromatography (SiO$_2$, PE/DCM/EtOAc=20:1:1-5:1:1) to obtain Compound 1-7. $^1$H NMR (DMSO-d$_6$, 400 MHz) δ 8.07 (s, 1H), 8.04 (s, 1H), 7.99 (br d, J=4.9 Hz, 1H), 7.57 (ddd, J=1.4, 8.2, 10.1 Hz, 1H), 7.52 (s, 1H), 7.47-7.40 (m, 2H), 7.38-7.30 (m, 4H), 4.84 (s, 2H), 4.75 (s, 2H).

Step E: Compound 1-7 (400 mg, 1.06 mmol) were dissolved in DCM (50 ml), cooled to minus 70 degrees Celsius, and ozone was bubbled into the solution for about 15 minutes, then excess ozone was blown away with nitrogen flow. A mixture of sodium borohydride (131.09 mg, 3.47 mmol) and methanol (5 mL) was added at minus 20 degrees Celsius, and the reaction solution was stirred at 0-20° C. for 1 hour. The reaction solution was quenched by adding water (10 mL) at 20 degrees Celsius and concentrated under reduced pressure. The crude product was purified by column chromatography (SiO$_2$, PE:EtOAc=100:0-1:1) to obtain Compound 1-8. $^1$H NMR (DMSO-d$_6$, 400 MHz) δ 8.10 (td, J=1.5, 4.8 Hz, 1H), 7.94 (s, 1H), 7.77 (ddd, J=1.5, 8.1, 10.1 Hz, 1H), 7.44 (ddd, J=0.6, 4.8, 7.9 Hz, 1H), 7.25 (s, 1H), 5.76 (d, J=6.2 Hz, 1H), 4.83-4.67 (m, 2H), 4.55 (q, J=6.1 Hz, 1H), 3.94 (dd, J=4.9, 11.4 Hz, 1H), 3.58 (dd, J=6.8, 11.4 Hz, 1H).

Step F: Compound 1-8 (190 mg, 620.42 μmol) was dissolved in THE (8 mL), lithium hexamethyldisilazide (1 mol/L, 930.63 μL) was added at minus 60 degrees Celsius, and the mixture solution was stirred at minus 60 degrees Celsius for 15 minutes under nitrogen protection. Phosphorus oxychloride (190.26 mg, 1.24 mmol) was added at minus 60 degrees Celsius, and the mixture was stirred at minus 60 degrees Celsius for 15 minutes under nitrogen protection. 2-bromoethylamine hydrobromide (1.02 μg, 4.96 μmmol) and diisopropylethylamine (641.46 mg, 4.96 mmol) were added. The reaction solution was stirred at 0° C. for 1 hour under nitrogen protection. Water (10 ml) was added to the reaction solution, and the solution was extracted with EtOAc (50 mL×3), then the combined organic phase was washed with brine (10 mL×1) and dried over anhydrous sodium sulfate, filtered and concentrated under reduced pressure. The crude product was purified by column chromatography (SiO$_2$, PE:EtOAc=100:0-1:1) to obtain Compound 1-9.

Step G: Compound 1-9 (360 mg, 601.85 mmol) was dissolved in THE (18 mL), and silver oxide (4.18 g, 18.06 mmol) was added. The mixture was stirred at 63° C. for 12 hours. The reaction solution was filtered, and the filtrate was concentrated under reduced pressure. The crude product was subjected to p-HPLC (separation column: Welch Ultimate XB—SiOH (Spec: 250 mm×50 mm, particle size: 10 m); mobile phase: [n-hexane-isopropanol]; elution gradient: isopropanol 20%-60%, 15 minutes) to obtain Compound 1. $^1$H NMR (CDCl$_3$, 400 MHz) δ 8.00 (td, J=1.6, 4.8 Hz, 1H), 7.66 (s, 1H), 7.48 (ddd, J=1.7, 7.8, 9.6 Hz, 1H), 7.20-7.16 (m, 2H), 5.42-5.29 (m, 1H), 4.87-4.59 (m, 2H), 4.00 (d, J=4.4 Hz, 2H), 2.13-1.96 (m, 8H).

Step H:

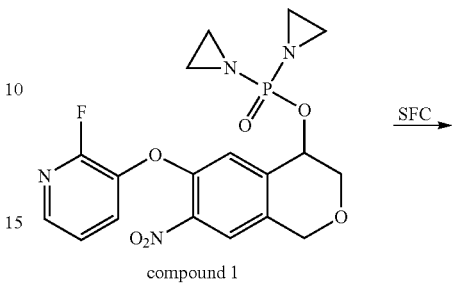

compound 1

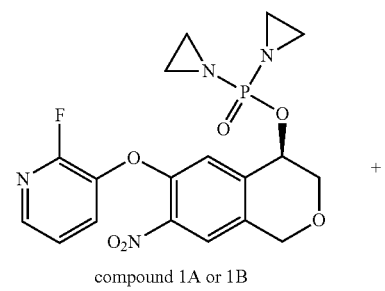

compound 1A or 1B

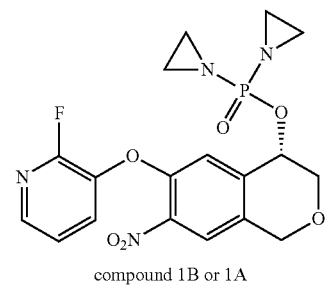

compound 1B or 1A

Compound 1 was chirally separated (separation column: DAICEL CHIRALPAK AD (Spec: 250 mm×30 mm, particle size: 10 m); mobile phase: [neutral-isopropanol]; elution gradient: isopropanol 35%-35%) to obtain Compound 1A (retention time=1.671 mins) and Compound 1B (retention time=1.870 mins).

Compound 1A: $^1$H NMR (CDCl$_3$, 400 MHz) δ 8.00 (td, J=1.6, 4.8 Hz, 1H), 7.66 (s, 1H), 7.48 (ddd, J=1.7, 7.9, 9.6 Hz, 1H), 7.21-7.15 (m, 2H), 5.35 (dt, J=8.76, 4.25 Hz, 1H), 4.87-4.57 (m, 2H), 4.00 (d, J=4.4 Hz, 2H), 2.14-1.96 (m, 8H). ee value (enantiomeric excess): 100%.

Compound 1B: $^1$H NMR (CDCl$_3$, 400 MHz) δ 8.00 (td, J=1.5, 4.8 Hz, 1H), 7.66 (s, 1H), 7.48 (ddd, J=1.7, 7.9, 9.6 Hz, 1H), 7.19-7.16 (m, 2H), 5.35 (dt, J=8.63, 4.32 Hz, 1H), 4.84-4.63 (m, 2H), 4.00 (d, J=4.4 Hz, 2H), 2.13-1.95 (m, 8H). ee value (enantiomeric excess): 98%.

Embodiment 2

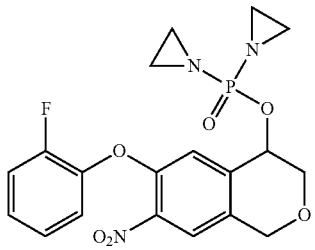

As regards the synthesis of Compound 2, one may refer to step A to G of the synthesis method of Compound 1. In the synthetic route of Compound 2, the starting material 1-1 was substituted by 2-fluorophenol.

Compound 2: $^1$H NMR (400 MHz, CDCl$_3$) δ 7.62 (s, 1H), 7.18-7.10 (m, 4H), 7.08 (s, 1H), 5.31 (td, J=4.2, 8.7 Hz, 1H), 4.82-4.73 (m, 1H), 4.68-4.58 (m, 1H), 3.99 (d, J=4.4 Hz, 2H), 2.08-1.92 (m, 8H).

BIOLOGICAL ACTIVITY

Experimental Embodiment 1: Antiproliferative Activity of the Compound of the Present Disclosure on NCI-H460 Cell Line Experimental Materials:
RPMI-1640 medium and penicillin/streptomycin antibiotics were purchased from Vicente, and fetal bovine serum was purchased from Biosera. CellTiter-Glo (Cell Viability Chemiluminescence Detection Reagent) reagent was purchased from Promega. The NCI-H460 cell line was purchased from Nanjing Kebai Biotechnology Co., Ltd. Nivo Multimode Plate Reader (PerkinElmer).

Experimental Method:
NCI-H460 cells (lung cancer) were seeded in a 96-well plate, 80 µL of cell suspension per well, which contained 4000 NCI-H460 cells. The cell plate was incubated overnight in a carbon dioxide incubator. The compound to be tested was diluted 5-fold to the ninth concentration with a multi-channel pipette, that is, the compound to be tested was diluted from 2 mM to 5.2 nM, and an experiment for the sample assayed in duplicate was set up. 78 µL of medium was added to the middle plate, and 2 µL of the gradient-diluted compound per well was transferred to the middle plate according to the corresponding position, then 20 µL per well was transferred to the cell plate after mixing. The concentration of the compound transferred to the cell plate ranged from 10 µM to 0.026 nM. The cell plate was incubated in the carbon dioxide incubator for 2 hours, and then the drug-containing medium was removed. The cell plate was rinsed once with fresh medium, and 100 µL of fresh medium without drug was added to each well to continue the incubation for 70 hours. Another cell plate was prepared, and the signal value was read as the maximum value (Max value in the following equation) on the day of drug addition to participate in data analysis. 25 µL of cell viability chemiluminescence detection reagent was added to each well of the cell plate, and the plate was incubated at room temperature for 10 minutes to stabilize the luminescent signal. The multimode plate reader was used for readings. 25 µL of cell viability chemiluminescence detection reagent was added to each well of the cell plate, and the plate was incubated at room temperature for 10 minutes to stabilize the luminescent signal. The multimode plate reader was used for readings.

Data Analysis:
The equation (Sample−Min)/(Max−Min)*100% is used to convert the raw data into an inhibition rate, and the value of IC$_{50}$ can be obtained by curve fitting with four parameters ("log(inhibitor) vs. response—Variable slope" mode in GraphPad Prism). Table 1 provides the inhibitory activity of the compounds of the present disclosure on the proliferation of NCI-H460 cells.

TABLE 1

Data of antiproliferative activity of the compounds of the present disclosure on NCI-H460 cell line

| Compound NO. | IC$_{50}$ (nM) |
| --- | --- |
| Compound 1 | 3.8 |
| Compound 1A | 10.1 |
| Compound 1B | 16.6 |
| Compound 2 | 21.6 |

Conclusion: the compound of the present disclosure has excellent antiproliferative activity against NCI-H460 with high expression of AKR1C3.

Experimental Embodiment 2: Antiproliferative Activity of the Compound of the Present Disclosure on HepG2 Cell Line Experimental Materials:
DMEM medium and penicillin/streptomycin antibiotics were purchased from Vicente, and fetal bovine serum was purchased from Biosera. CellTiter-Glo (Cell Viability Chemiluminescence Detection Reagent) Reagent was purchased from Promega. The HepG2 cell line was purchased from the Cell Bank of the Chinese Academy of Sciences. Nivo Multimode Plate Reader (PerkinElmer).

Experimental Method:
HepG2 cells (liver cancer) were seeded in a white 384-well plate, 25 µM of cell suspension per well, which contained 1000 HepG2 cells. The cell plate was incubated overnight in a carbon dioxide incubator. The compound to be tested was diluted 3-fold to the ninth concentration with a multi-channel pipette, that is, the compound to be tested was diluted from 200 mM to 30 nM, and an experiment for the sample assayed in duplicate was set up. 99 µM of medium was added to the middle plate, and 1 µL of the gradient-diluted compound per well was transferred to the middle plate according to the corresponding position, then 25 µM per well was transferred to the cell plate after mixing. The concentration of the compound transferred to the cell plate ranged from 1 µM to 0.15 nM. The cell plate was incubated in the carbon dioxide incubator for 5 days. Another cell plate was prepared, and the signal value as the maximum value (Max value in the following equation) was read on the day of drug addition to participate in data analysis. 20 µM of cell viability chemiluminescence detection reagent was added to each well of the cell plate, and the plate was incubated at room temperature for 10 minutes to stabilize the luminescent signal. The multimode plate reader was used for readings. 20 µM of cell viability chemiluminescence detection reagent was added to each well of the cell plate, and the plate was incubated at room temperature for 10 minutes to stabilize the luminescent signal. The multi-mode plate reader was used for readings.

Data Analysis:

The equation (Sample−Min)/(Max−Min)*100% was used to convert the raw data into an inhibition rate, and the value of $IC_{50}$ can be obtained by curve fitting with four parameters ("log(inhibitor) vs. response—Variable slope" mode in GraphPad Prism). Table 2 provides the inhibitory activity of the compounds of the present disclosure on the proliferation of HepG2 cells.

TABLE 2

Data of antiproliferative activity of the compound of the present disclosure on HepG2 cell line

| Compound NO. | $IC_{50}$ (nM) |
|---|---|
| Compound 1A | 9.3 |
| Compound 1B | 7.4 |

Conclusion: the compounds of the present disclosure have excellent antiproliferative activity against HepG2 with high expression of AKR1C3.

Experimental Embodiment 3: Antiproliferative Activity of the Compound of the Present Disclosure on Hep3B Cell Line Experimental Materials:

EMEM medium and penicillin/streptomycin antibiotics were purchased from Vicente, and fetal bovine serum was purchased from Biosera. CellTiter-Glo (Cell Viability Chemiluminescence Detection Reagent) Reagent was purchased from Promega. The Hep3B cell line was purchased from the Cell Bank of the Chinese Academy of Sciences. Nivo Multimode Plate Reader (PerkinElmer).

Experimental Method:

Hep3B cells (liver cancer) were seeded in a white 96-well plate, 80 µL of cell suspension per well, which contained 3000 Hep3B cells. The cell plate was incubated overnight in a carbon dioxide incubator. The compound to be tested was diluted 5-fold to the ninth concentration with a multichannel pipette, that is, the compound to be tested was diluted from 2 mM to 5.12 nM, and an experiment for the sample assayed in duplicate was set up. 78 L of medium was added to the middle plate, and 2 µL of each well of the gradient dilution compound was transferred to the middle plate according to the corresponding position, then 20 µL per well was transferred to the cell plate after mixing. The concentration of the compound transferred to the cell plate ranged from 10 µM to 0.0256 nM. The cell plate was incubated in the carbon dioxide incubator for 3 days. Another cell plate was prepared, and the signal value as the maximum value (Max value in the following equation) was read on the day of drug addition to participate in data analysis. 25 µL of cell viability chemiluminescence detection reagent was added to each well of the cell plate, and the plate was incubated at room temperature for 10 minutes to stabilize the luminescent signal. The multimode plate reader was used for readings. 25 µL of cell viability chemiluminescence detection reagent was added to each well of the cell plate, and the plate was incubated at room temperature for 10 minutes to stabilize the luminescent signal. The multimode plate reader was used for readings.

Data Analysis:

The equation (Sample−Min)/(Max−Min)*100% was used to convert the raw data into an inhibition rate, and the value of $IC_{50}$ can be obtained by curve fitting with four parameters ("log(inhibitor) vs. response—Variable slope" mode in GraphPad Prism). Table 3 provides the inhibitory activity of the compounds of the present disclosure on the proliferation of Hep3B cells.

TABLE 3

Data of antiproliferative activity of the compound of the present disclosure on Hep3B cell line

| Compound NO. | $IC_{50}$ (nM) |
|---|---|
| Compound 1A | >10,000 |
| Compound 1B | >10,000 |

Conclusion: the compound of the present disclosure has no antiproliferative activity on Hep3B with low expression of AKR1C3.

Experimental Embodiment 4: In Vivo Pharmacodynamics Study of the Compound of the Present Disclosure on Transplanted Tumor Model of Human Liver Cancer HepG2 Cells in Nude Mice Experimental Purpose:

The inhibition of tumor growth in vivo for transplanted tumor model of human liver cancer HepG2 cells in nude mice was used in this experiment.

Experimental Materials:

Female NU/NU nude mice (number: 90; week-age: 6-8 weeks), human liver cancer cell HepG2, MEM medium, fetal bovine serum (FBS), trypsin, Penicillin-Streptomycin, PBS, Matrigel, etc.

Experimental Method and Steps:

1. Cell Culture

Routine cell culture was carried out in MEM medium containing 10% fetal bovine serum at 37° C. in 5% $CO_2$; 0.25% trypsin was used for digestion and passage; according to the cell growth, the cell was passaged 2 to 3 times a week, and the ratio of passage was 1:3 to 1:6.

2. Preparation of Animal Model

Hep G2 cells in the logarithmic growth phase were collected, counted and resuspended in 50% serum-free MEM medium and 50% Matrigel, the cell concentration was adjusted to $2.5 \times 10^7$ cells/mL; the cells were blown with a pipette to disperse evenly and were put into a 50 mL centrifuge tube, and the centrifuge tube was put in an ice box; the cell suspension was drawn up with a 1 mL syringe and injected subcutaneously into the armpit of the right fore limb of nude mice, and each animal was inoculated 200 µL ($5 \times 10^6$ cells/mouse) and the transplanted tumor model of HepG2 cells in nude mice was established. After inoculation, the state of the animals and the growth of the tumor were observed regularly, and the diameter of the tumor was measured with an electronic vernier caliper. The data was directly input into an Excel spreadsheet to calculate the tumor volume. When the tumor volume reached 100-300 $mm^3$, 48 animals with good health and similar tumor volume were selected, and randomized block method was used to divide the animals into 8 groups (n=6) according to the tumor volume, and the average weight of each group was kept consistent as much as possible. The day of grouping was regarded as the first day of the experiment (D1). After the experiment started, the tumor diameter was measured twice a week, and the tumor volume was calculated. At the same time, the weight of the animals was weighed and recorded.

The formula for calculating tumor volume (TV) is as follows:

TV (mm$^3$)=$l \times w^2/2$

Wherein, l represents the long diameter of the tumor (mm); w represents the short diameter of the tumor (mm).

3. Animal Grouping and Administration:

The animal grouping and dosage regimen are shown in Table 4. The administration was started on the day of grouping, and the experiment was ended 3 weeks later (or the tumor volume in the solvent control group reached 2000 mm$^3$ or above, whichever came first), and the administration volume was 10 mL·kg$^{-1}$. As the solvent control group, Group 1 was given DMSO & 30% HP-β-CD (10:90, v:v) by intravenous injection once a week for 3 consecutive weeks; Groups 2 and 3 were given Compound 1A and 1B by intravenous injection with the dose of 1 mg·kg$^{-1}$.

TABLE 4

Dosage regimen of pharmacodynamic experiment for transplanted tumor model of HepG2 cells in nude mice

| Group | Sample | Number of animals | Dose (mg · kg$^{-1}$) | Administration volume (mL · kg$^{-1}$) | Route of administration | Administration frequency |
|---|---|---|---|---|---|---|
| 1 | DMSO & 30% HP-B-CD (10:90, V:V) | 6 | — | 10 | intravenous injection (IV) | Day 0, Day 7, Day 14 |
| 2 | Compound 1A | 6 | 1 | 10 | intravenous injection (IV) | Day 0, Day 7, Day 14 |
| 3 | Compound 1B | 6 | 1 | 10 | intravenous injection (IV) | Day 0, Day 7, Day 14 |

4. Experimental Indicators:

The calculation formula of tumor growth inhibition rate (GI) is:

TGI=100%×[1−(TV$_{t(T)}$−TV$_{initial(T)}$)/(TV$_{t(c)}$−TV$_{initial(C)}$)]

where TV$_{t(T)}$ represents the tumor volume measured each time in the treatment group; TV$_{initial(T)}$ represents the tumor volume in the treatment group at the time of grouping and administration; TV$_{t(C)}$ represents the tumor volume measured each time in the solvent control group; TV$_{initial(C)}$ represents the tumor volume of the solvent control group at the time of grouping and administration. The formula of the relative animal weight is calculated as:

Relative animal weight=BW$_t$/BW$_{initial}$*100 wherein, BW$_t$ represents the animal weight measured each time during the administration period; B$_{Initial}$ represents the animal weight at the time of grouping and administration.

5. The Inhibition of the Compounds on the Growth of Subcutaneously Transplanted Tumors of HepG2 Liver Cancer in Nude Mice:

In this experiment, the efficacy of Compounds 1A and 1B in the transplanted tumor model of HepG2 liver cancer was evaluated. After 21 days of administration, Compound 1B had a significant effect of inhibiting tumor growth at a dose of 1 mg/kg, all p<0.05 compared with the vehicle control group. The tumor volume and inhibition rate are shown in Table 5, and the tumor growth curve is shown in FIG. 1.

TABLE 5

Tumor volume and tumor growth inhibition rate of animals in each group during administration

| Group | Mean tumor volume ± SEM (mm$^3$) or tumor growth inhibition rate (TGI) | | | | | | |
|---|---|---|---|---|---|---|---|
| | D1 | D5 | D8 | D12 | D15 | D19 | D22 |
| solvent control group | 140 ± 7 | 370 ± 31 | 648 ± 74 | 946 ± 112 | 1568 ± 186 | 2198 ± 145 | 2545 ± 199 |
| Compound 1A, 1.0 mg/kg TGI | 140 ± 7 | 245 ± 13 54% | 313 ± 22 66% | 474 ± 60 58% | 853 ± 112 50% | 1158 ± 186 51% | 1415 ± 220 47% |
| Compound 1B, 1.0 mg/kg TGI | 140 ± 6 | 185 ± 24 80% | 215 ± 35 85% | 276 ± 58 83% | 412 ± 100 81% | 602 ± 157 78% | 681 ± 189 77% |

Figure 2:
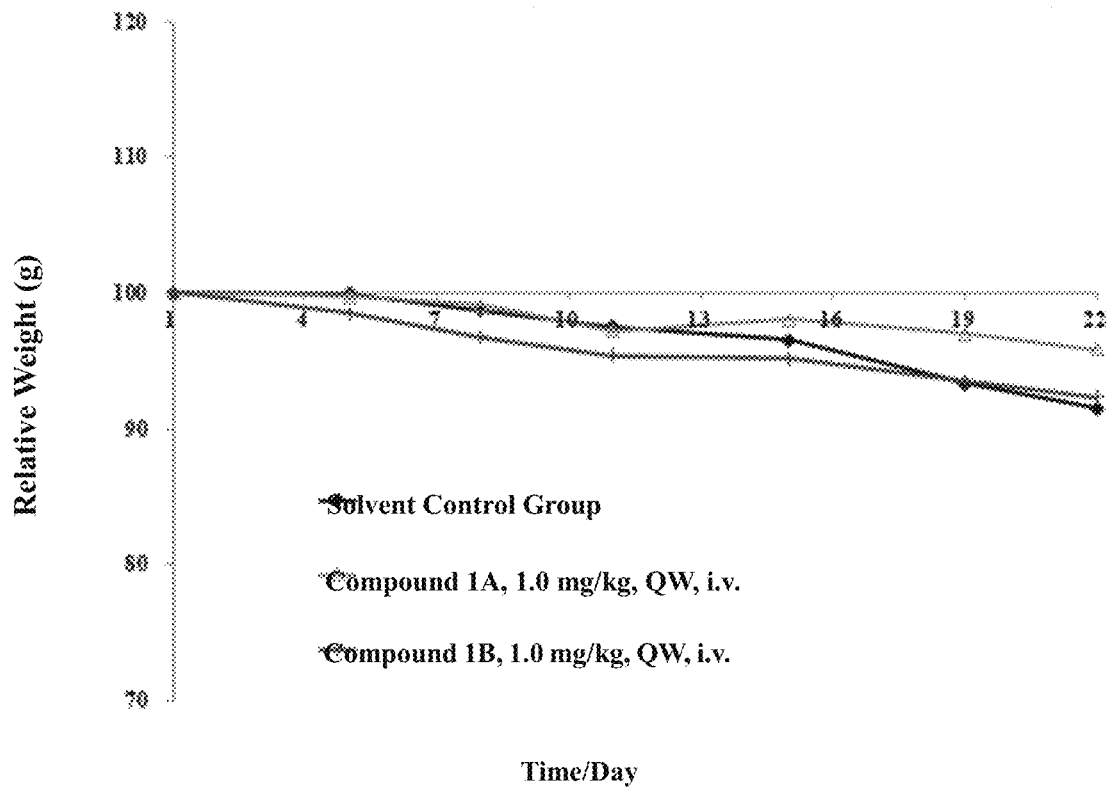
FIG. 2 is the relative weight growth curve of animal of each group during the administration period.

6. Changes in Weight:

In this model, the weight of animals in all treatment groups did not fluctuate greatly, and the whole average weight loss of animals did not exceed 10%, as shown in FIG. 2 for details.

Conclusion: the compound of the present disclosure exhibits good antitumor efficacy.

Experimental Embodiment 5: In Vivo Pharmacodynamics Study of the Compound of the Present Disclosure on Orthotopic Xenograft Tumor Model of Human Liver Cancer HepG2

Experimental Purpose:

In this experiment orthotopic xenograft tumor model of HepG2 in nude mouse was used to evaluate the antitumor effect of the compound.

Experimental Materials:

Female Balb/C nude mice, the week age is 6-8 weeks, the weight is 18-22 g, fetal bovine serum (PBS), EMEM medium (Cat. No. 30-2003), phosphate buffer, Antibiotic-Antimycotic (Cat. No. 15240-062), Matrigel and Pancreatin.

Experimental Method and Steps:

1. Preparation of Cell Culture: HepG2-Luc Cells were Cultured in Monolayer In Vitro.

The culture conditions were that 10% heat-inactivated fetal bovine serum was added into EMEM medium and the cells were cultured in an incubator containing 5% $CO_2$ at 37° C.

Digestion with trypsin-EDTA was performed twice a week for passaging. When the cell saturation was 80%-90%, the cells were digested with trypsin-EDTA, counted and resuspended in PBS and Matrigel (PBS:Matrigel=1:1), and the density was $166.67 \times 10^6$ cells/mL.

Tumor cell inoculation and grouping: Animals were anesthetized by intramuscular injection of 60 mg/kg Zytex 50 and 1.5 mg/kg xylazine. When the animals were under deep anesthesia, the animals were properly fixed, and the abdomen skin was cleaned with 75% alcohol cotton balls. An incision of about 10 mm was cut with surgery, and 0.03 mL (PBS:Matrigel=1:1) of HepG2-luc cells were orthotopically inoculated on the left lobe of the liver of each mouse, and then the incision on the muscle layer was sutured with absorbable catgut, and the incision on the skin was sutured with a stapler. After surgery, the animals were kept warm on a warming blanket until they woke up. To relieve the pain of the animals, 2 mg/kg of meloxicam (administered subcutaneously once a day) will be administered for 3 days in a row after surgery. 15 animals were randomly selected to detect the growth of the signal. When the signal began to rise, they were randomly divided into groups according to the value of the bioluminescence signal, and drug treatment was started. The detailed treatment plan is shown in Table 6.

TABLE 6

Grouping and dosage regimen of experimental animals

| Group | Number of animals | Drug | Dose (mg · kg$^{-1}$) | Administration volume (μL/g)$^2$ | Route of administration | Administration frequency |
|---|---|---|---|---|---|---|
| 1 | 6 | blank group | — | 10 | intravenous injection (IV) | Day 0, Day 7, Day 14 |
| 2 | 6 | Compound 1B | 1 | 10 | intravenous injection (IV) | Day 0, Day 7, Day 14 |
| 3 | 6 | Compound 1B | 3 | 10 | intravenous injection (IV) | Day 0, Day 7, Day 14 |

3. Experimental Indicator:

The experimental indicator is whether the tumor growth can be delayed or whether the tumor can be cured. After tumor inoculation, the bioluminescence signal and animal weight were detected once a week, which continued until the end of the observation period. The bioluminescent signal value can be used to calculate T/C (wherein T is the administration group, and C is the average intensity value of bioluminescence of the blank control group at the set time). Calculation formula of Tumor Growth Inhibition Rate (TGI): TGI (%)=$[1-(T_i-T_0)/(V_i-V_0)] \times 100$, wherein $T_i$ is the average intensity of bioluminescence of the treatment group at the set time; $T_0$ is the average intensity of bioluminescence at the starting point of administration. $V_i$ is the average intensity of bioluminescence of the blank control group at the set time; $V_0$ is the average intensity of bioluminescence at the starting point of administration.

4. Inhibitory of Compounds on the Growth of Subcutaneously Transplanted Tumors of HepG2 Liver Cancer in Nude Mice:

In this experiment, the efficacy of Compound 1B in the orthotopic xenograft tumor model of HepG2 liver cancer was evaluated. After 21 days of administration, Compound 1B had a significant effect of inhibiting tumor growth at a dose of 1 mg/kg, all p<0.05 compared with the vehicle control group. With the dose of compound 1B increased to 3 mg/kg, the anti-tumor effect is significantly enhanced.

Figure 3:
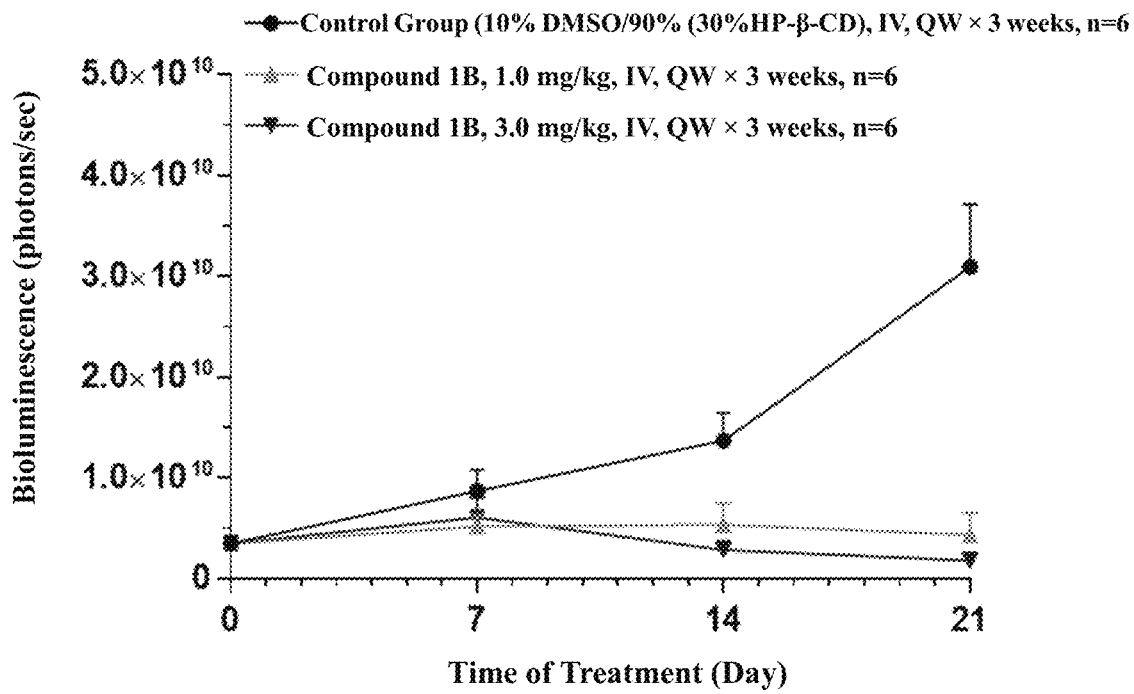
FIG. 3 is the tumor growth signal-time curve.
Figure 4:
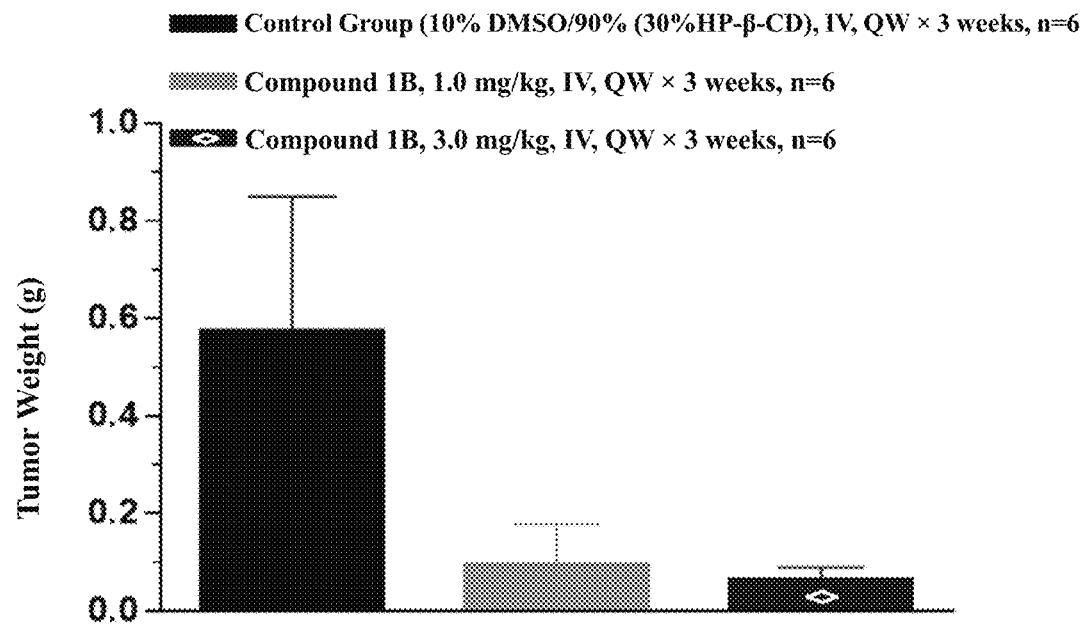
FIG. 4 is the schematic diagram of the tumor weight at the end point of the experiment.

Experimental results: See FIG. 3 and Tables 7, 8 and 9. The tumor weight at the end point of the experiment is shown in FIG. 4 and Table 10.

TABLE 7

Antitumor effect of the compound of the present disclosure on orthotopic xenograft tumor model of HepG2

| Group | Bioluminescence (photons/sec)[a] (Day 1) | Bioluminescence (photons/sec)[a] (Day 21) | RBL (Day 21) | TGI (%) (Day 21) | T/C (%) (Day 21) |
|---|---|---|---|---|---|
| 1 | 3.51E+09 ± 7.27E+08 | 3.09E+10 ± 6.17E+09 | 9.78 ± 1.67 | — | — |
| 2 | 3.51E+09 ± 7.41E+08 | 4.35E+09 ± 2.19E+09 | 0.98 ± 0.31 | 96.97 | 10.04 |
| 3 | 3.51E+09 ± 7.96E+08 | 1.81E+09 ± 7.52E+08 | 0.41 ± 0.12 | 106.21 | 4.22 |

Note:
[a]Mean ± SEM, n = 6.

TABLE 8

The p value of the comparison of the relative tumor signal growth value (RBL) between groups in the xenograft tumor model of HepG2

| Group | Group 1 | Group 2 | Group 3 | Group 4 |
|---|---|---|---|---|
| 1 | N/A | 0.038 | 0.029 | 0.024 |
| 2 | 0.029 | 0.921 | N/A | 0.682 |
| 3 | 0.024 | 0.384 | 0.682 | N/A |

Note:
The p value was obtained by using one-way ANOVA to analyze the relative value of tumor volume (RBL). There was a significant difference in the F value between groups ($p < 0.001$), and the Games-Howell test was used.

TABLE 9

Bioluminescence signal values of tumor tissue at different time points in each group

| group | Bioluminescence (photons/sec)[a] Days after administration | | | |
|---|---|---|---|---|
| | 0 | 7 | 14 | 21 |
| 1 | 1.47E+09 ± 3.54E+08 | 4.86E+09 ± 9.42E+08 | 1.24E+10 ± 3.98E+09 | 1.80E+10 ± 3.52E+09 |
| 2 | 1.47E+09 ± 3.20E+08 | 4.34E+09 ± 1.74E+09 | 4.76E+09 ± 2.40E+09 | 4.52E+09 ± 2.29E+09 |
| 3 | 1.47E+09 ± 2.84E+08 | 2.77E+09 ± 5.16E+08 | 2.59E+09 ± 3.58E+08 | 2.16E+09 ± 3.23E+08 |

Note:
[a]Mean ± SEM, n = 6

TABLE 10

Tumor weight in each group

| Group | Tumor weight (g)[a] (Day 21) | T/C$_{weight}$[b] (%) | p value[c] |
|---|---|---|---|
| 1 | 0.569 ± 0.115 | — | — |
| 2 | 0.090 ± 0.036 | 15.80 | 0.072 |
| 3 | 0.058 ± 0.013 | 10.23 | 0.059 |

Note:
[a]Mean ± SEM, n = 6.
[b]Tumor growth inhibition was calculated as T/C$_{weight}$ = TW$_{treatment}$/TW$_{vehicle}$.
[c]p value was obtained by one-way ANOVA and vehicle treatment group to analyze tumor weight, F value was significantly different ($p < 0.001$), and the Games-Howell test was used for analysis.

5. Changes in Weight

Figure 5:
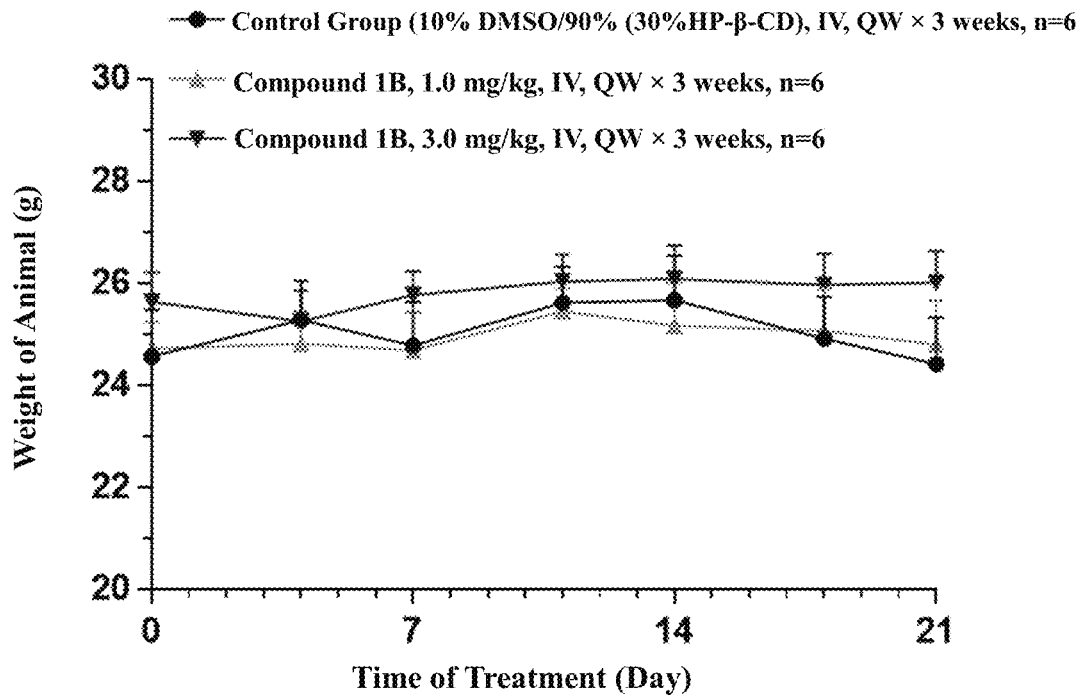
FIG. 5 is the weight of animal—time curve.
Figure 6:
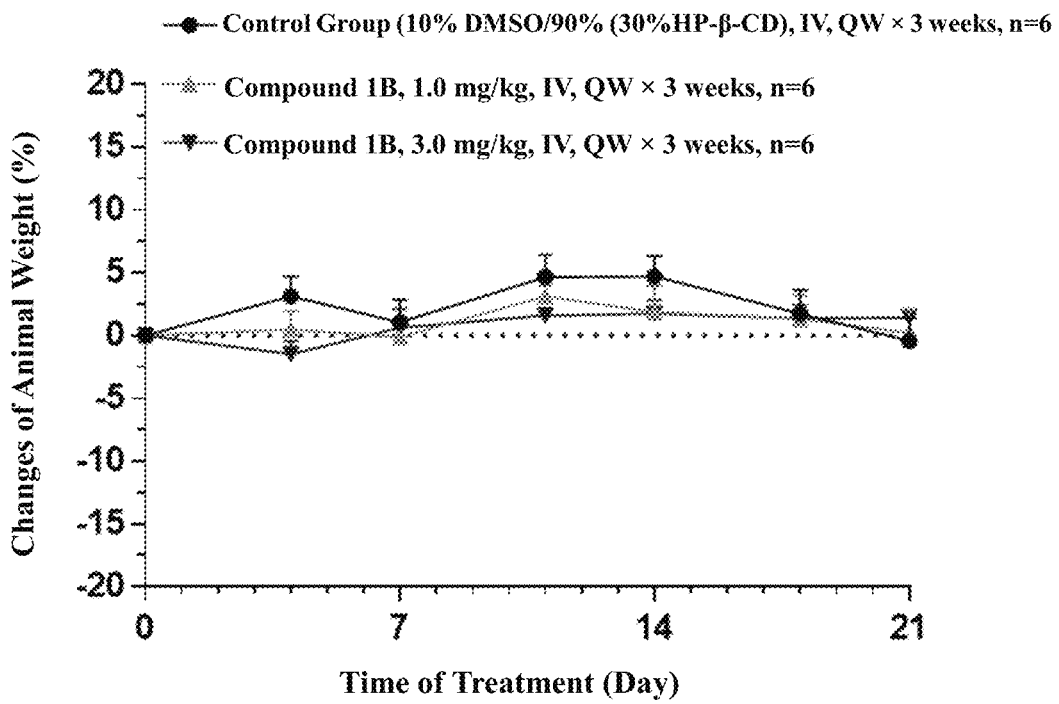
FIG. 6 is the changes of animal weight—time curve.

In this model, the weight of animals in all treatment groups did not fluctuate greatly, and the decrease of average weight of all animals did not exceed 5%, as shown in FIG. 5 and FIG. 6.

Conclusion: The compound of the present disclosure has the effect of significantly inhibiting tumor growth, and the animal weight in the administration group does not decrease significantly, showing good safety.

What is claimed is:

1. A compound represented by formula (I) or a pharmaceutically acceptable salt thereof,

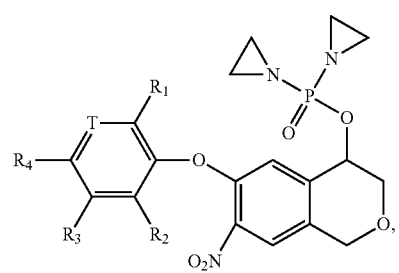

(I)

wherein T is N or CH;

$R_1$ and $R_2$ are each independently H, F, Cl, Br, I, or $C_{1-3}$ alkyl, wherein the $C_{1-3}$ alkyl is optionally substituted by 1, 2, or 3 $R_a$;

each $R_a$ is independently F, Cl, Br, I, —CN, —OH or —NH$_2$;

$R_3$ and $R_4$ are each independently H, F, Cl, Br, I, CN, $C_{1-3}$ alkyl, $C_{1-3}$ alkoxy,

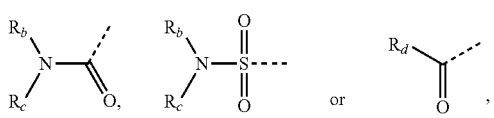

wherein the C$_{1-3}$ alkyl is optionally substituted by 1, 2 or 3 R$_e$;

R$_b$ and R$_c$ are each independently H, —CH$_3$, —CH$_2$CH$_3$, —(CH$_2$)$_2$CH$_3$ or —CH(CH$_3$)$_2$;

R$_d$ is —CH$_3$, —CH$_2$CH$_3$, —(CH$_2$)$_2$CH$_3$ or —CH(CH$_3$)$_2$;

each R$_e$ is independently F, Cl, Br, I, —CN, —OH or —NH$_2$.

2. The compound or pharmaceutically acceptable salt thereof according to claim 1, wherein the compound has a structure represented by formula (I-1):

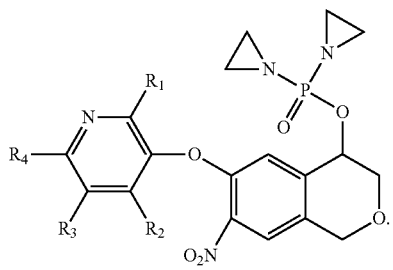

3. The compound or the pharmaceutically acceptable salt thereof according to claim 1, wherein the compound has a structure represented by formula (I-3) or (I-4):

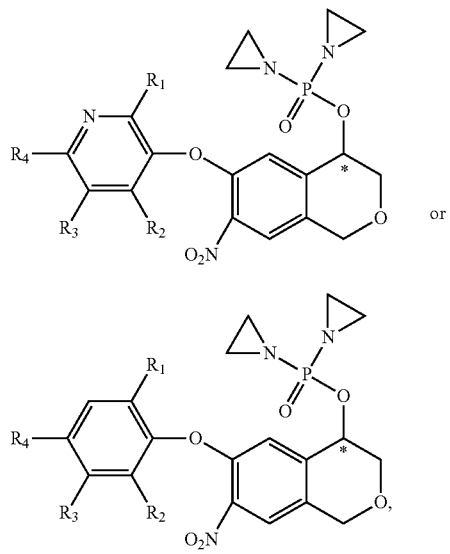

wherein the carbon atom with "*" is a chiral carbon atom, which exists in the form of (R) or (S) single enantiomer or enriched in one enantiomer.

4. The compound or the pharmaceutically acceptable salt thereof according to claim 1, wherein R$_1$ and R$_2$ are each independently H, F, Cl, Br, I or —CH$_3$, wherein the —CH$_3$ is optionally substituted by 1, 2 or 3 R$_a$.

5. The compound or the pharmaceutically acceptable salt thereof according to claim 4, wherein R$_1$ is H, F, Cl, Br, I or —CH$_3$; R$_2$ is H.

6. The compound or the pharmaceutically acceptable salt thereof according to claim 1, wherein R$_3$ and R$_4$ are each independently H, F, Cl, Br, I, CN, —CH$_3$, —OCH$_3$,

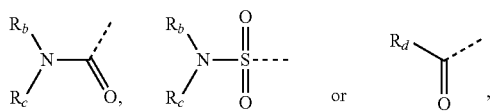

wherein the —CH$_3$ is optionally substituted by 1, 2 or 3 R$_e$.

7. The compound or the pharmaceutically acceptable salt thereof according to claim 6, wherein R$_3$ and R$_4$ are each independently H, F, —CH$_3$, —CHF$_2$, —OCH$_3$,

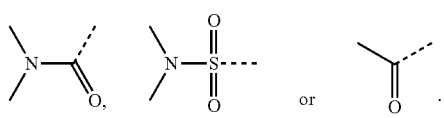

8. The compound or the pharmaceutically acceptable salt thereof according to claim 7, wherein R$_3$ and R$_4$ are each independently H.

9. A compound selected from the group consisting of:

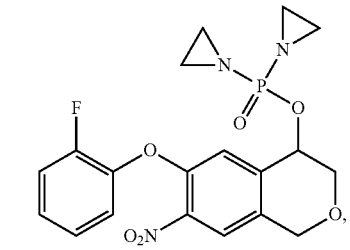

or a pharmaceutically acceptable salt thereof.

10. A compound selected from the group consisting of:

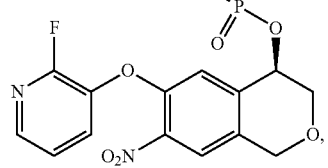

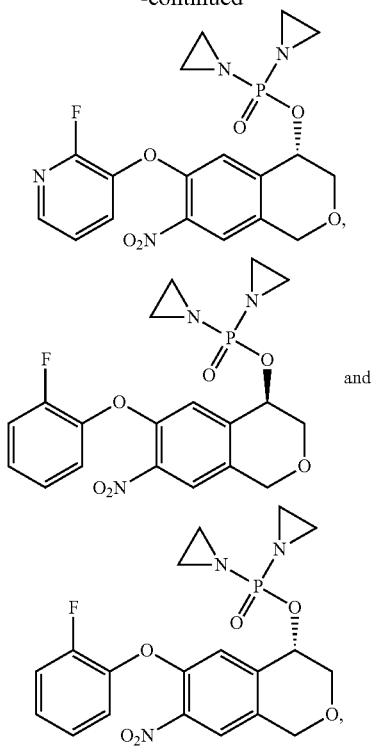

or a pharmaceutically acceptable salt thereof.

11. A method for treating liver cancer in a subject in need thereof, comprising: administering an effective amount of the compound or the pharmaceutically acceptable salt thereof according to claim 1 to the subject.

12. A method for treating liver cancer in a subject in need thereof, comprising: administering an effective amount of the compound or the pharmaceutically acceptable salt thereof according to claim 9 to the subject.

13. A method for treating liver cancer in a subject in need thereof, comprising: administering an effective amount of the compound or the pharmaceutically acceptable salt thereof according to claim 10 to the subject.

14. The compound or pharmaceutically acceptable salt thereof according to claim 1, wherein the compound has a structure represented by formula (I-2):

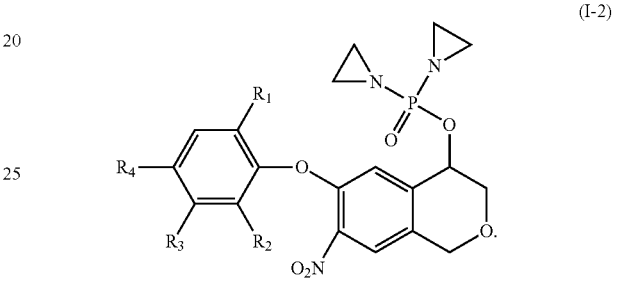

* * * * *